United States Patent [19]

Ramig

[11] 4,069,186

[45] Jan. 17, 1978

[54] OPACIFIED LATEX PAINT CONTAINING PLASTIC POLYMER PARTICLES

[75] Inventor: Alex Ramig, Brunswick, Ohio

[73] Assignee: SCM Corporation, New York, N.Y.

[21] Appl. No.: 718,049

[22] Filed: Aug. 26, 1976

Related U.S. Application Data

[63] Continuation-in-part of Ser. No. 663,064, March 2, 1976, abandoned, which is a continuation-in-part of Ser. No. 473,287, May 24, 1974, abandoned, which is a continuation-in-part of Ser. No. 345,301, March 27, 1973, abandoned.

[51] Int. Cl.² ............... C08L 25/06; C08L 27/06; C08L 33/12
[52] U.S. Cl. ............... 260/29.6 RB; 260/29.6 RW; 260/42.55; 260/899; 260/901; 428/522; 428/523
[58] Field of Search ............... 260/29.6 RB, 29.6 RW, 260/29.6 R, 29.6 WB, 901, 42.55

[56] References Cited

U.S. PATENT DOCUMENTS

| | | | |
|---|---|---|---|
| 3,423,351 | 1/1969 | Pierce et al. | 260/29.6 R |
| 3,669,728 | 6/1972 | Seiner | 260/29.6 R X |
| 3,779,800 | 12/1973 | Heiser | 260/29.6 RB X |
| 3,879,314 | 4/1975 | Gunning et al. | 260/29.6 NR X |

FOREIGN PATENT DOCUMENTS 1,192,492  5/1970  United Kingdom.

Primary Examiner—Howard E. Schain
Assistant Examiner—W. C. Danison, Jr.
Attorney, Agent, or Firm—Thomas M. Schmitz

[57] ABSTRACT

An opacified latex dispersion paint composition comprises film-forming latex binder having a major weight proportion of polymer particles not smaller than about 1,000 A, non-film-forming plastic polymer particles having a weighted average particle size diameter between about 1,000 A and 10,000 A, and opacifying pigment. The latex paint is compounded at a pigment-volume-content (PVC) greater than the critical-PVC as measured by opacity and provides improved opacified paint film having excellent film integrity properties.

10 Claims, 7 Drawing Figures (PRIOR ART)

OPACIFIED LATEX PAINT CONTAINING PLASTIC POLYMER PARTICLES

This application is a continuation-in-part of application Ser. No. 663,064 filed Mar. 2, 1976 and now abandoned which in turn is a continuation-in-part of application Ser. No. 473,287 filed May 24, 1974 and now abandoned which in turn is a continuation-in-part of application Ser. No. 345,301 filed Mar. 27, 1973 and now abandoned, and said applications are incorporated herein by reference.

BACKGROUND OF THE INVENTION

This invention relates to opacified latex paints. Conventional latex paints are prepared by dispersing sufficient opacifying pigment such as titanium dioxide into film-forming transparent polymeric binders to provide an opacified paint film. Opaque or decorative paint films have been suggested based on the presence of air voids in the paint films such as provided by cellular or vesiculated particles in British Pat. No. 1,178,162, Canadian Pat. No. 856,863, and British Pat. No. 1,192,492. Opacification has been further achieved by entrapping air in the film to provide voids in the paint film and generally are referred to as bubble coatings. Such coatings have only limited opacity and primarily function as decorative or semi-opaque coatings rather than conventional opacified paint coatings. Hence, the best opacified paint films are conventional latex paints compounded with titanium dioxide and extender pigments such as calcium carbonate.

A conventional parameter for describing prior art latex paints is the pigment-volume-content (PVC) which is the percent by volume of pigment present in the dried paint film relative to the total volume of the dried paint film. At a certain PVC, the volume of pigments in the paint film abruptly causes considerable air voids in the dry paint film due to binder deficiency. The PVC measurement at this level of pigment content is characterized as critical-PVC wherein a binder deficiency occurs such that insufficient binder is present in the paint film to encapsulate the pigment particles and fill any remaining voids in the film. At the onset of such porosity in the paint film due to binder deficiency, the physical durability properties of the dried paint film abruptly diminish with higher PVC's thereby causing a substantial drop or discontinuity of physical properties of conventional paint films due to increased pigment loading. In conventional prior art latex paints, opacity and porosity exhibit approximately the same sensitivity to the onset of air voids in the paint film wherein opacity increases with increased film porosity but most paint film physical properties (except opacity) such as scrub resistance and enamel holdout abruptly diminish at approximately the same PVC which has been known in prior art paints as a critical-PVC. Conventional prior art paints suffer a drastic loss of enamel holdout properties simultaneous with achieving increased opacity or hiding characteristics of the paint film with the result that the critical-PVC of conventional latex paints is a narrow PVC range (FIG. 1) wherein the critical-PVC is generally a compromise at a point of minimum opacity (for given $TiO_2$ level) and maximum paint film physical properties.

It now has been found that latex paints containing solid non-film-forming plastic pigment and opacifying pigments provide hard, dried paint films having substantially increased opacity as well as substantially improved physical properties. Improved opacity is obtained over a wide range of PVC's before the onset of excessive porosity in the paint film whereby the preferred useful range of PVC's of the paint of this invention incorporates both maximum opacity and maximum enamel holdout as well as other optimized physical properties. This invention broadly provides for improved latex paints having a PVC above the critical-PVC and capable of providing good opacified paint films having desirable paint film integrity properties.

Accordingly, a primary object of this invention is to provide an improved latex dispersion paint having a wide range of PVC's above the critical-PVC as measured by opacity for providing substantially improved paint films having high PVC's while retaining good paint film characteristics.

These and other advantages of this invention will become more apparent by referring to the drawings and the Detailed Description of the Invention.

SUMMARY OF THE INVENTION

The aqueous latex dispersion paint of this invention comprises film-forming latex binder having a preponderance of film-forming polymer particles not smaller than about 1,000 A in diameter, solid non-film-forming polymer particles having a weighted average particle size diameter between about 1,000 A and 10,000 A and at least about 5% opacifying pigment on a dry solids volume basis.

IN THE DRAWINGS

DETAILED DESCRIPTION OF THE INVENTION

Figure 1:
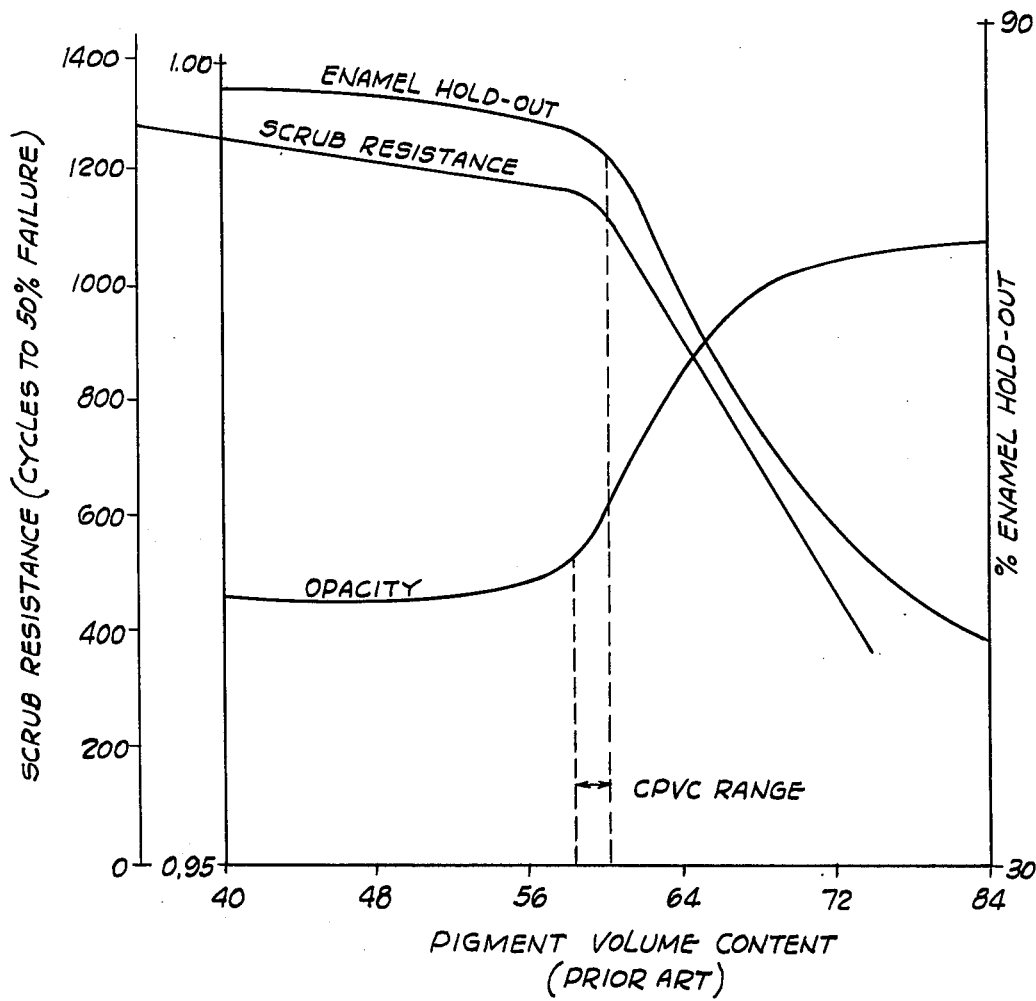
FIG. 1 is a scaled graph indicating a PVC ladder series of a typical prior art latex paint showing physical properties of paint films as a function of pigment-volume-content (PVC)

A PVC ladder series is a scaled graph relating physical properties of dried paint films as a function of pigment-volume-content (PVC). The PVC is varied by changing the relative volume of the binder by adding or subtracting a given pigment component while maintaining the volume percent of other pigment components constant. Paint film characteristics shown in the drawings are more particularly defined in the examples.

Referring first to the drawings, FIG. 1 shows a PVC ladder series of a typical prior art paint film containing 23% by volume titanium dioxide and variable amounts of calcium carbonate pigment as an extender pigment to provide a variable pigment-volume-content (PVC). Opacity and enamel holdout are plotted as a function of PVC which is a well-known descriptive parameter for characterizing paint films and is defined as the volume percent of pigment in a unit volume of a dried paint film. A critical-PVC is indicated to be a narrow range on the PVC-axis at which just sufficient binder is available to encapsulate each pigment particle and fill the residual voids between the pigments. The critical-PVC is determined in FIG. 1 by the break in the opacity curve and the break in the enamel holdout curve wherein the breaks in each curve are appoximately at the same PVC. As viewed in FIG. 1, the enamel holdout property declines drastically as opacity increases wherein neither the enamel holdout nor the opacity is simultaneously at a maximum. Opacity and enamel holdout both exhibit sensitivity to the onset of air voids in the dry paint film as indicated by PVC's proximate and beyond the critical-PVC. Most other conventional physical properties of paint films such as scrub resistance, tensile strength, and the like diminish quite drastically upon reaching the critical-PVC.

Figure 2:
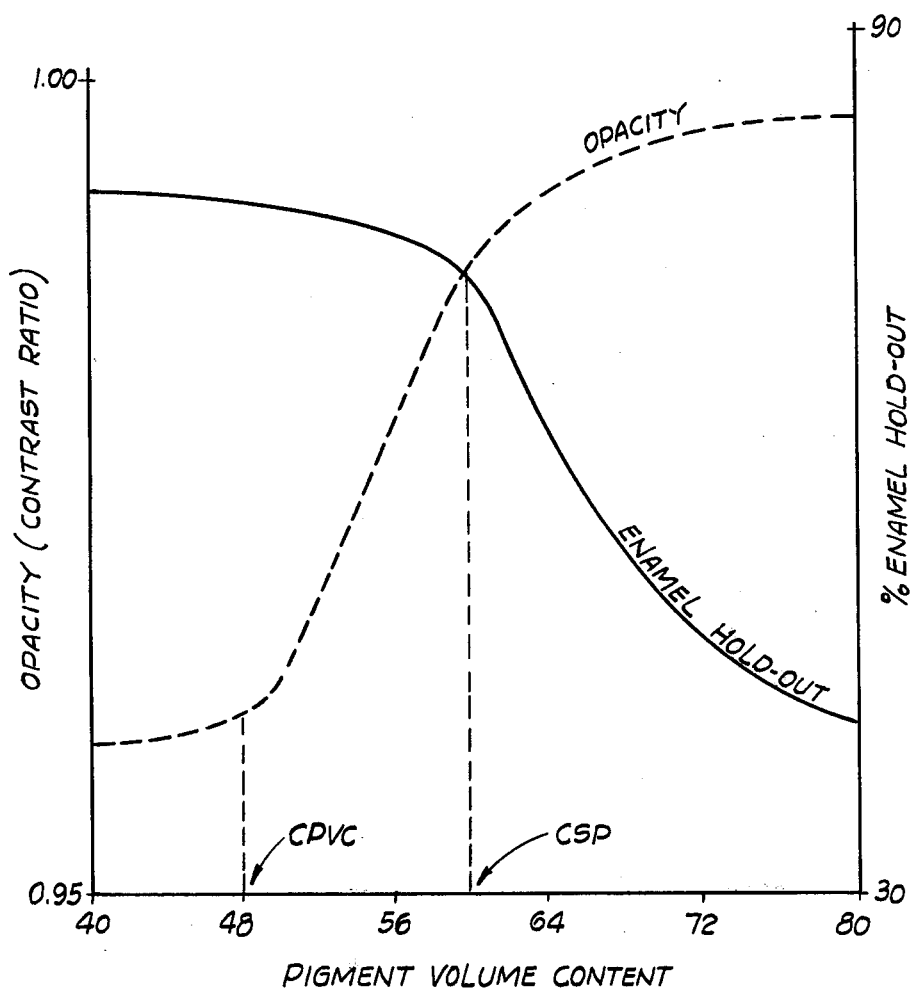
FIG. 2 is a scaled graph indicating a PVC ladder series of a paint of this invention showing physical properties of paint films as a function of pigment-volume-content (PVC)

FIG. 2 shows a scale graph of paint films of this invention and relates enamel holdout and opacity as a function of non-film-forming components or pigment-volume-content (PVC). The paint films comprise binder, 23% (volume) opacifing $TiO_2$, and varying amounts of non-film-forming solid plastic particles to achieve the indicated variable PVC on the X-axis. The critical-PVC as measured by opacity, hereinafter critical-PVC (opacity), is indicated as the break in the opacity curve and determined by a straight line coinciding with the lower horizontally disposed portion of the opacity curve intersecting with a straight line coinciding with the vertically disposed portion of the opacity curve as more particularly described by A. Ramig in *Journal of Paint Technology*, Vol. 47, pages 60–66 (March 1975), or the *Official Digest of the Federation of Societies for Paint Technology* (March, 1965), the article commencing at page 272 and incorporated herein by reference. FIG. 2 readily indicates that paints containing non-film-forming plastic particles in combination with a given amount of opacifying $TiO_2$ surprisingly provide paint films having maximum enamel holdout properties well beyond the substantial increase in opacity occurring at the conventional critical-PVC. Accordingly, a major benefit achieved by this invention is that substantially higher levels of opacity can be achieved by paint films prior to the onset of excessive porosity in the paint film in addition to maintaining good film integrity properties at high PVC's beyond the critical surface porosity-PVC as will become more apparent hereinafter. The broad PVC range for obtaining substantially improved paint films in accordance with this invention is between about 30% to 75% PVC. The lowermost PVC level (30%) in the broad range of 30% to 75% PVC represents the lowermost critical-PVC for opacity, whereas the uppermost PVC level represents a maximum allowable PVC for maintaining film integrity properties of the paint film. Preferred paints of this invention provide paint films substantially free of surface porosity and such preferred paints have a PVC above the critical-PVC (opacity) but less than the critical surface porosity PVC as measured by enamel holdout. The critical surface porosity PVC as measured by enamel holdout, hereinafter critical surface PVC (enamel holdout), is the PVC at the break in the enamel holdout curve where enamel holdout properties abruptly diminish and such break in the enamel holdout curve can be determined in a manner similar to determining the break in the opacity curve at critical-PVC. The useful PVC range is dependent upon the formulation of the paint. The desirable PVC differential between critical-PVC (opacity) and critical surface porosity PVC (enamel holdout) for preferred paints is at least about five PVC units. The preferred PVC range for preferred top quality paints is between about 48% to 64% PVC. At least about 5% opacifying pigment such as $TiO_2$ is required to achieve minimum acceptable opacity for ordinary paint films up to about 8 mils thickness.

Figure 3:
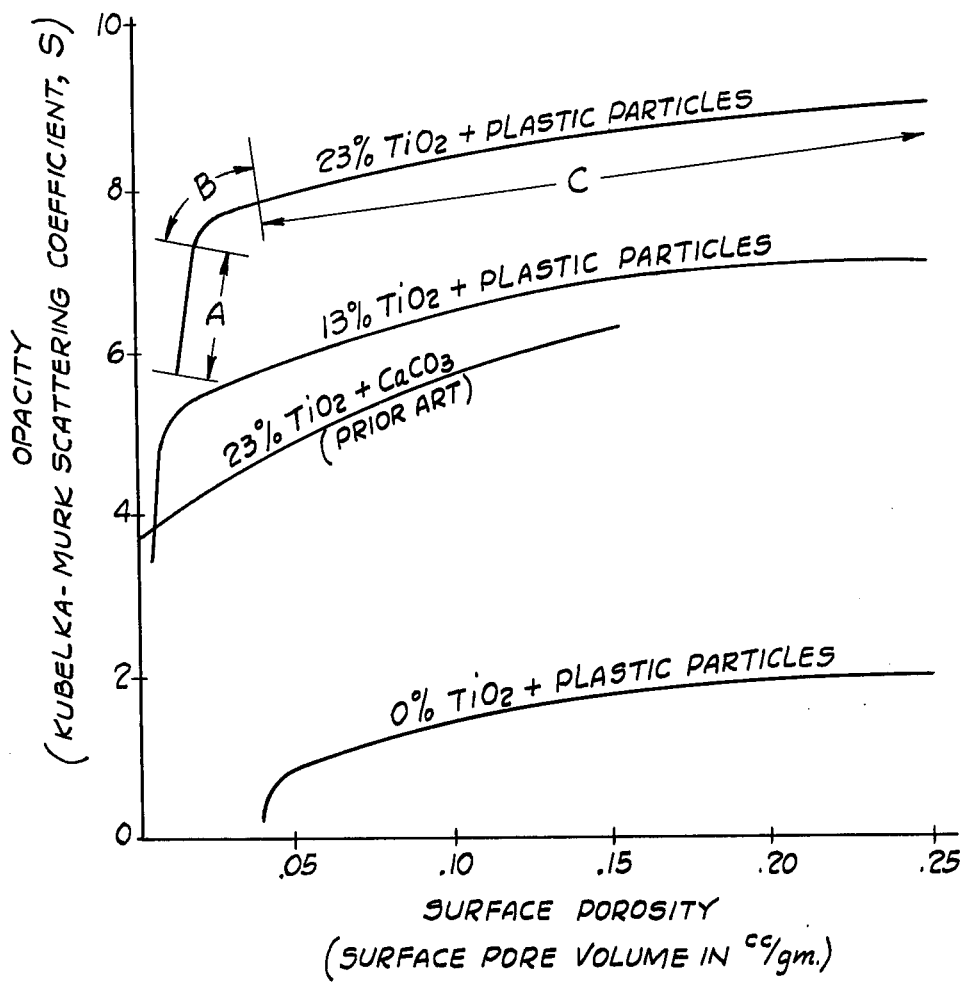
FIG. 3 is a scaled graph comparing opacity of various paint films as a function of paint film porosity.

FIG. 3 compares a typical prior art paint to paint films of this invention by relating opacity to surface porosity of the paint films. Surface porosity was measured by mercury intrusion porosimity using American Instrument Co. Aminco Model 5-7121B and measuring pores less than about 1.5 microns in diameter. Surface porosity is directly related to PVC but primarily depicts the increase of paint film surface porosity in the paint film as the critical surface porosity is reached and surpassed. FIG. 3, like FIG. 2, indicates that substantially improved opacity can be achieved by paint films of this invention before the onset of excessive porosity in the paint film at PVC's greater than the critical-PVC of the paint film whereby enamel holdout and other film integrity properties can be maintained while substantially increasing opacity. Although not intended to be bound by theory, it is believed that the increased opacity achieved in region A on the curves in FIG. 3 is primarily due to a combination of improved dispersion of opacifying pigment within the paint film caused by efficient interspacing of opacifying pigment by the plastic particles and closed cell microvoids in the paint film caused by packing of plastic particles. Opacity achieved at range B in FIG. 3 is due primarily to the formation of open cell voids within the paint film by packing plastic particles wherein microvoid frequency increases resulting in light scattering within the microvoid cells which provides increased opacity with minimal surface porosity of the dried paint film. Region C in FIG. 3 is beyond the critical surface porosity PVC wherein opacity increases slightly and enamel holdout properties are reduced but nevertheless surprisingly provide very useful porous paint films having good film integrity properties at high PVC's above the critical surface porosity PVC. Although paint films in region C are porous, the propensity of pores appears to be less than about 1.5 microns and hence the porous paint films provide excellent scrub resistance. Paint films in accordance with this invention fall broadly within regions A, B, and C, preferred paint films within regions A and B, and most preferred paint films within region A in FIG. 3. Non-film-forming polymer particles substantially larger than 10,000 A tend to form large microvoids which in turn increase detrimentally the large pore porosity in the paint film and thus the most preferred polymer particles are between about 1,000 A and 6,000 A. Accordingly, the most preferred high quality and high opacity paints of this invention are generally formulated to corresond to range A on the representative curves in FIG. 3 and preferred paints within region B. All paints in accordance with this invention exceed the maximum opacity obtained by conventional paints formulated at critical-PVC and at equivalent levels of opacifying pigments.

Figure 4:
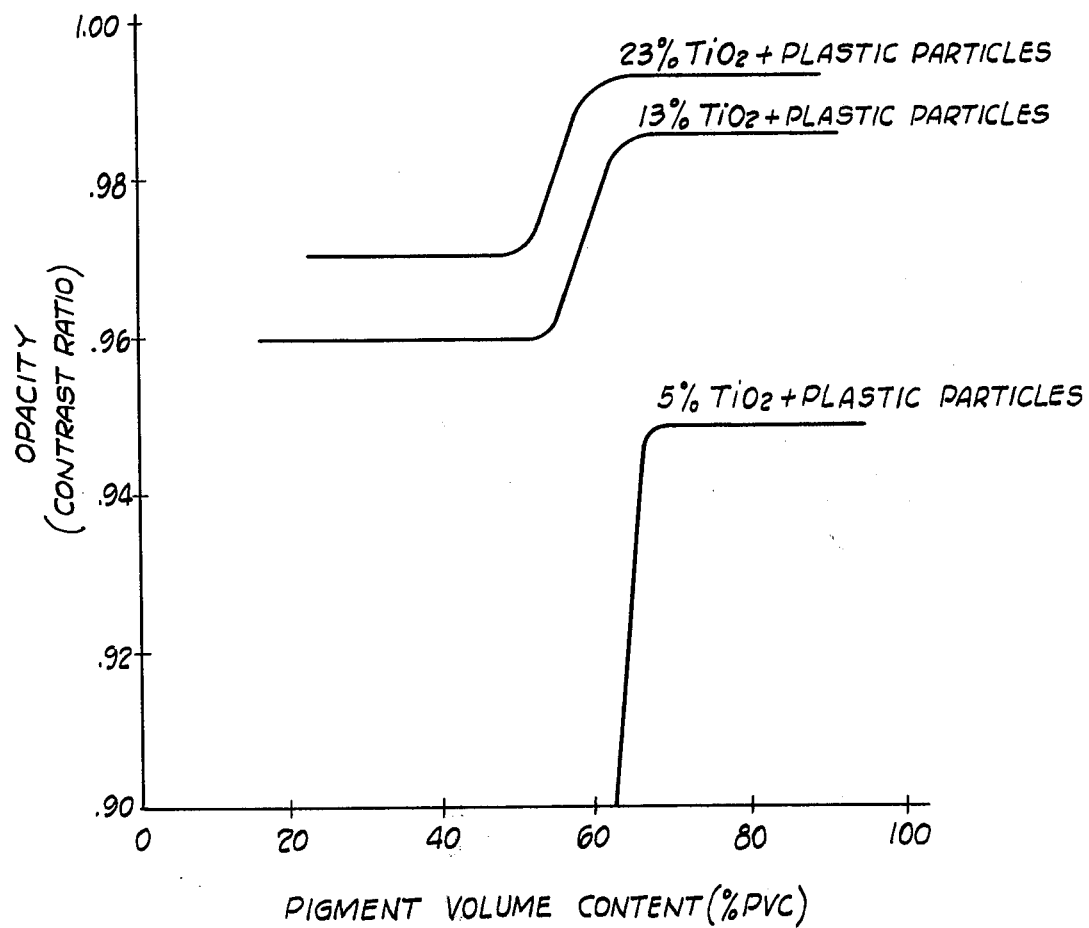
FIG. 4 is a scaled graph similar to FIG. 2 showing opacity as a function of PVC indicating varying levels of $TiO_2$.

FIG. 4 is a scaled graph similar to FIG. 2 showing opacity of various inventive paint films as related to $TiO_2$ content. Paint film at a given $TiO_2$ content plus non-film-forming plastic particles are plotted with opacity (contrast ratio) as a function of percent pigment-volume-content (PVC). Although not shown in FIG. 4, opacity of the 0% level of $TiO_2$ is essentially negligible below a PVC of about 60% whereas above 60% PVC opacity is measurable but results in less than acceptable opacity for conventional opacified paint films. Accordingly, at least about 5% $TiO_2$ is required and preferably at least about 10% on a dry solids volume basis $TiO_2$ is present in the paint films of this invention.

Figure 5:
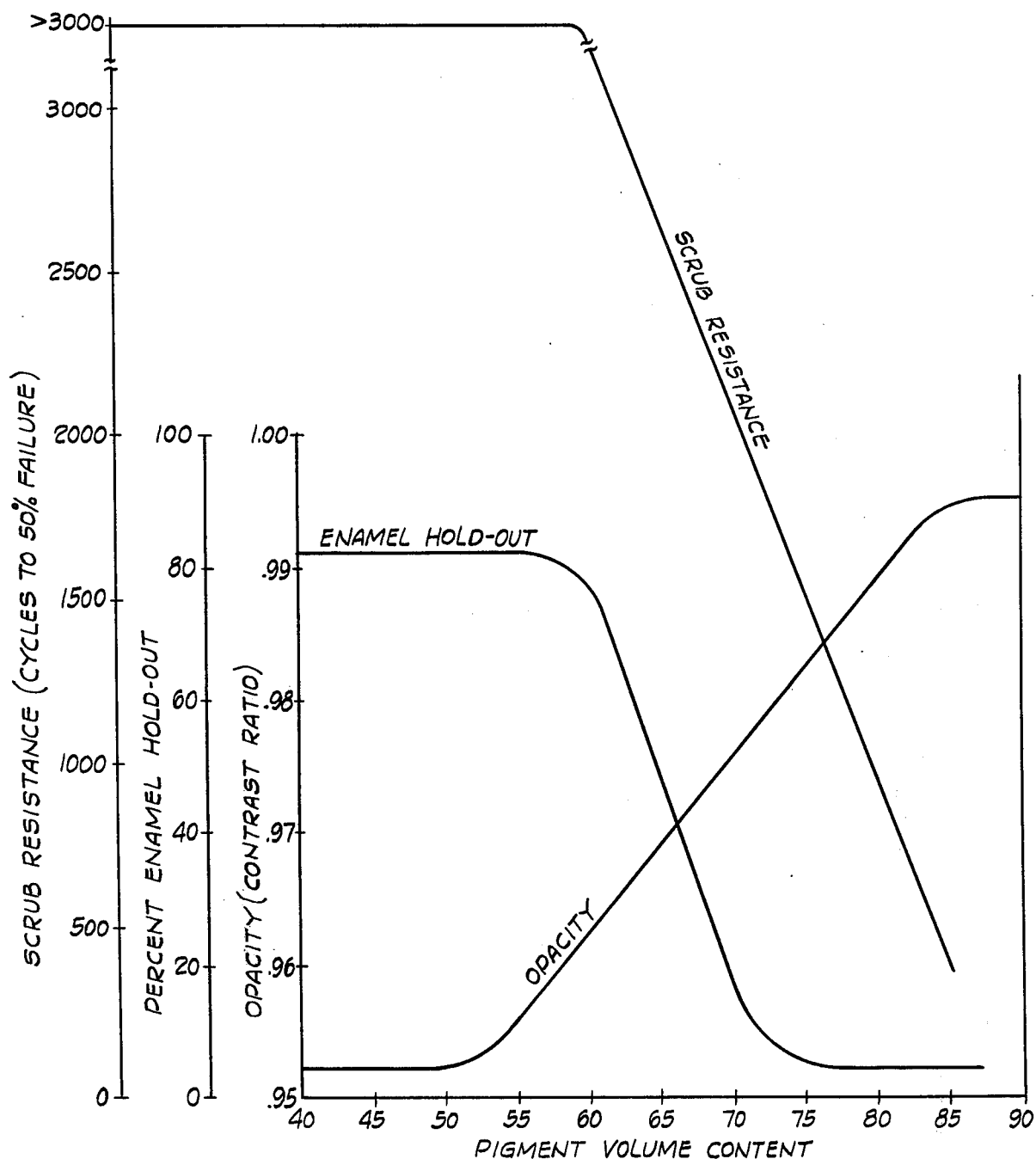
FIG. 5 is a scaled graph similar to FIG. 2 indicating a PVC ladder series of a latex paint of this invention showing the retention of film integrity properties at high PVC's beyond the critical surface porosity PVC.

FIG. 5 illustrates a ladder series of paint films in accordance with a further aspect of this invention indicating that improved paint films can be achieved by latex paints at PVC's beyond the critical surface porosity PVC whereby the dried paint film has low enamel holdout properties but surprisingly retains film integrity properties such as scrub resistance, burnish resistance, mar resistance, stain resistance, dirt resistance, grime resistance, and abrasion resistance as identified by the scrub resistance curve in FIG. 5. Latex paint compositions in accordance with this aspect of the invention can be compounded at PVC's up to about 75% PVC wherein non-opacifying extender and filler pigments as described hereinafter can be effectively utilized at high PVC levels in combination with plastic pigment and opacifying pigment.

Figure 6:
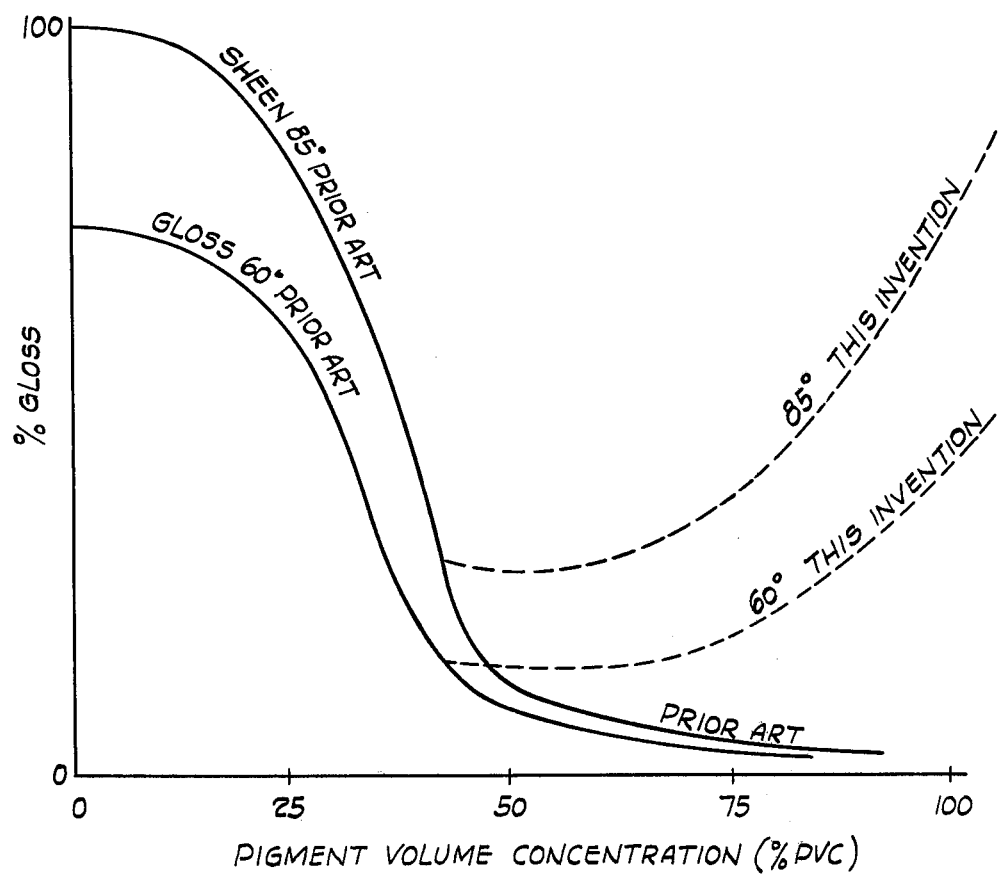
FIG. 6 shows gloss (60°) and sheen (85°) as a function of PVC for paint films of this invention in comparison to prior art paint films.

FIG. 6 relates gloss of paint films as a function of PVC. Gloss is measured at 60° and sheen is measured at 85° in accordance with ASTM D523-67. Conventional paints decline drastically in gloss in the vicinity of about 30% PVC and continue to decline and asymptotically approach zero gloss at PVC's above critical-PVC. In contrast, both gloss and sheen recover in paint films of this invention at PVC's above critical-PVC and continue to increase with increasing PVC.

Figure 7:
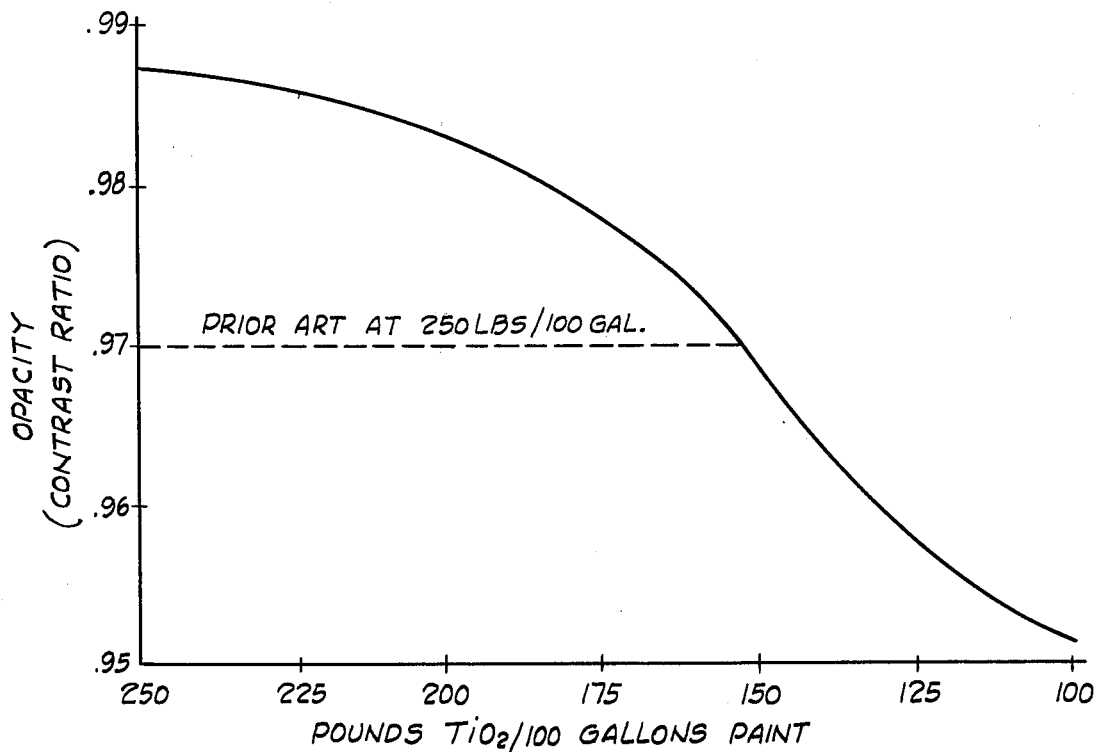
FIG. 7 is a scaled graph showing opacity as a function of $TiO_2$ content at constant PVC relative to prior art paints.

FIG. 7 shows opacity (contrast ratio) of a series of paint films of this invention as a function of decreasing amounts of $TiO_2$ and compares this with a prior art paint (dotted line) which contains about 250 pounds of $TiO_2$ per 100 gallons of paint and a volume solids of 33%. The series of paint films shown in FIG. 7 contain the indicated amount of $TiO_2$ plus plastic particles to yield constant PVC's.

Referring generally to the paint composition of this invention, the latex dispersion paint comprises solid non-film-forming polymeric particles (plastic particles), opacifying pigment, and film-forming polymer particles. The total solids by weight is between about 30% and 70%. Various conventional additives can be added to the paint for stability and application purposes. Paint films are formed by coalescence of the film-forming binder into a binding matrix at the application temperature to generate a hard, tack-free paint film. The non-film-forming particles are solid and non-cellular as well as being non-film-forming under the conditions of paint application. Non-film-forming polymer particles can be identified generally as having a glass transition temperature of at least about 5° C., advantageously about 15° C., and preferably about 25° C. higher than the ambient coalescing temperature that the paint film coalesces into a hardened dry paint film. Thus, paint films of this invention applied and formed at room temperature of about 25° C. will contain non-film-forming polymer particles having a glass transistion temperature of at least about 30° C., advantageously above 40° C., and preferably at least about 50° C. Similarly, paint films force dried by heating processes contain non-film-forming polymeric particles having a glass transition temperature preferably at least about 25° C. greater than the ambient coalescence temperature of the binder. The term "glass transition temperature" is a term well known in the art and generally defines the onset of long range molecular motion wherein the polymer preserves the outward appearance of a solid but becomes rubbery and then tacky with increasing temperature and undergoes plastic flow and elastic deformation. A polymer particle having a glass transition temperature greater than room temperature will be a non-film-former at room temperature. The glass transition temperature can be measured in accordance with 41 *Journal of Paint Technology*, pages 167–178 (1969). The glass transition temperatures (Tg) are best measured when such polymer particles are in the latex paint wherein interacting effects of various paint ingredients are taken into account such as coalescing agents. The Tg can be calculated in accordance with the Fox equation* or estimated by testing for a Vicat softening point as set forth in ASTM 1525. Under force drying conditions of the paint film, ambient coalescence temperatures are higher than room temperature, such as 120° F. to 200° F. or even as high as 400° F. In high temperature curing, the glass transition temperature of the non-film-forming polymer particle must be higher than the ultimate temperature of the film being dried.

*Fox equation is $1/Tg = \Sigma W_i/Ti$

Referring now more particularly to the non-film-forming particles, the glass transition temperature (Tg) for the solid, non-film-forming polymer particles herein are measured when such polymer particles are in the aqueous latex emulsion paint mixture whereby the interacting effects of the various paint ingredients such as coalescing aids are taken into account. The non-film-forming polymer particles have a weighted average particle diameter between about 1,000 A and 10,000 A (0.1 to 1.0 microns). Advantageously, the solid polymer particles are between about 1,000 A to 8,000 A, and preferably between about 1,000 A to 6,000 A. Average particle diameters can be measured in accordance with known electron-microscopy techniques as described by S. H. Maron in *Journal of Applied Physics*, Vol. 23, page 900 (August, 1952) or by disc centrifuge in accordance with *Polymer Engineering and Science*, Vol. 14, pages 332–337 (May, 1974). The refractive index of the non-film-forming particles is between about 1.3 and 1.7 as measured by ASTM D-542 whereas the density or specific gravity thereof is between about 0.9 and 1.5. The non-film-forming polymer particles are solid and non-cellular and preferably are substantially spherical in geometric shape. The opacified paint containing about 5% to 70% non-film-forming polymer particles, advantageously 10% to 60%, and preferably 15% to 50% on a dry solids volume basis. Preferably the latex paint contains at least about 10% non-film-forming particles or alternatively contain such particles in a volumetric proportion greater than the volumetric proportion of opacifying pigment. The non-film-forming particles are preferably polystyrene but can be polymers and copolymers of other ethylenically unsaturated monomers such as disclosed in U.S. Pat. No. 3,423,351 provided the Tg of the particles are sufficiently high and remain discrete and do not coalesce at the ambient application and curing temperature. The non-film-forming polymer particles can be copolymerized ethylenically unsaturated monomers having a carbon-to-carbon ethylenic double bond unsaturation capable of addition polymerization through the ethylenic double bond and can include, for example, styrene, substituted styrenes, vinyl chloride, vinylidene chloride, acrylonitrile, methacrylonitrile, esters of acrylic and methacrylic acid and tertiary butyl acrylate wherein the polymers or copolymers thereof having a Tg greater than about 30° C. Preferred polymer particles are polystyrene, polyvinyl chloride, and polymethyl methacrylate, as further illustrated in the examples.

Opacifying pigments are used in combination with the non-film-forming polymeric particles and are generally pigments having a refractive index of at least about 1.8. Typical white opacifying pigments include rutile and anatase titanium dioxide, lithopone, zinc sulfide, lead titanate, antimony oxide, zirconium oxide, titanium calcium, white lead, titanium barium, zinc oxide, leaded zinc oxide, mixtures of the same, and like pigments. The preferred white inorganic opacifying pigment is rutile titanium dioxide having a weight average particle size between about 0.2 to 0.4 microns. Titanium yellow and like pigments having a high refractive index can be utilized as opacifying pigments as well as imparting tints to the paint. Although most opacifying pigments are white, all opacifying pigments having a high index of refraction above about 1.8 should be considered an opacifying pigment for the purpose of this invention regardless of its tinting (tinctorial) effect on the resulting paint film. Opacifying pigments comprise at least about 5% and up to 30% on a dry solids volume basis of the latex paint and preferably between about 10% to 25% on a dry solids volume basis. Opacifying pigment efficiently interacts with the plastic pigment and becomes uniformly spaced throughout the paint film by the plastic pigment. The increased opacity achieved prior to the onset of high surface porosity is primarily attributed to a combination of increased dispersion and spacing of opacifying pigment caused by the spacing effect of the plastic particles and by the formation of an essentially closed cell microvoid structure within the paint film. Ordinary paint films are usually about 1 to 3 mils thick when applied by brush or roller, and in such instance, between about 5% and about 25% opacifying pigment such as rutile $TiO_2$ on a dry solids volume basis is required for the opacified paint of this invention. In general, the thinner the film, the higher the opacifying pigment content required. For best hiding in such films, pigmentary rutile $TiO_2$ preferably will be used at about a 10% to 25% level on a dry solids volume basis.

A film-forming binder is utilized to coalesce at the temperature of paint application and drying of the paint film to form a binding matrix for the opacifying pigments, non-film-forming polymer particles (plastic particles), and other non-film-forming additives such as extender and filler pigment. The film-forming latex binder has a major weight portion of the polymer particles preferably between 1,000 A and 10,000 A. Providing a film-forming binder having a major weight portion of particles not smaller than about 1,000 A is desirable in order to obtain the desired opacity which appears to be due to the inabilty of binder particles to penetrate the microvoid structure formed in the film as a result of the packing of the non-film-forming particles. The film-forming latex polymer particles should have weight average diameter between about 1,000 A, to 10,000 A and preferably 3,000 A to 8,000 A for desirable rheological behavior.

Aqueous compounded film-forming binder latices can be emulsions or dispersions of a very broad class of synthetic resins suitable for compounding into latex paints. The suitable latices by themselves or when compounded with plasticizers, solvents, and the like contain polymer particles having a glass transition temperature suitable for fusing and coalescing into a film under application conditions. Thus, for air-drying latex paints at ordinary temperature, e.g., 25° C., the film-forming binder latex will have polymer particles having a glass transition temperature less than 20° C. and at least about 5° C. and preferably at least 15° C. below the ambient coalescing temperature and therefore will form a film or binding matrix at such prevailing ambient coalescing temperature. Where the film is to be force dried, as by heating in an oven, the glass transition temperature of the film-forming binder polymer particles can be substantially higher, but still preferably at least about 15° C. lower than the drying coalescing temperature so that said binder will form a binding matrix film under the force drying conditions. The glass transition temperature of the film-forming binder must be at least about 10° C. lower than the glass transition temperature of the non-film-forming polymer particles which must have a glass transition temperature above the ultimate maximum temperature of the film being dried. Preferably, the differential between the glass transition temperature of the film-forming and the non-film-forming polymer particles is about 30° C. Glass transition temperatures can be measured when the film-forming polymer particles are in the latex paint mixture wherein the interacting effects of the various paint ingredients such as coalescing aids are taken into account.

Typical polymeric film-forming binders suitable for the latex dispersion paints of this invention to be applied at about room temperature include a wide variety of polymers and copolymers of ethylenically unsaturated monomers, such as polymers containing units of vinyl acetate, acrylate, methacrylates, isoprene, butadiene, styrene, alkylated styrene and/or dibutyl maleate, and are often compounded with stabilizers and additives and, for example, disclosed in the following U.S. Patents:

2,498,712; 2,676,930; 2,700,026; 2,702,284; 2,728,737;
2,731,434; 2,731,435; 2,739,136; 2,773,849;
2,807,597; 2,809,950; 2,833,747; 2,837,444;
2,852,475; 2,852,476; 2,868,752; 2,875,166;
2,881,143; 2,883,355; 2,884,397; 2,886,546;
2,887,460; 2,888,421; 2,888,422; 2,888,505;
2,889,236; 2,889,314; 2,892,802; 2,894,927;
2,895,930; 2,897,100; 2,897,165; 2,899,397;
2,905,649; 2,907,720; 2,902,721; 2,904,523;
2,912,399; 2,913,429; 2,914,497; 2,917,476;
2,921,046; 2,922,781; 2,933,467; 2,933,469;
2,934,529; 2,936,295; and 2,937,156.

Other film-forming binder useful for higher temperature work are polymers which often include vinyl chloride units, tetrafluoroethylene units, ethylene units and acrylonitrile units. Various film-forming acrylic binders are useful for the practice of this invention, and include polymers of methacrylic acid, acrylic acid, and their mixtures, copolymers or terpolymers of acrylic and/or methacrylic acid esters with styrene and/or vinyl acetate and copolymers or terpolymers of methacrylic acid esters and/or acrylic acid esters with acrylonitrile, as well as emulsion copolymerizates such as bodied oils and phenolic monomers as shown in U.S. Pat. No. 2,962,151.

Accordingly, suitable film-forming latex binders include: vinyl and vinylidene polymers containing units such as vinyl acetate, vinyl chloride, vinylidene chloride, and the like; hydrocarbon polymers and copolymers containing ethylene or propylene units and oxygenated or halogenated derivatives of either, butadiene, oxygenated butadiene, isoprene, oxygenated isoprene, butadiene-styrene, butadiene vinyl toluene, isoprene-styrene and the like; acrylic polymer and copolymers containing units of acrylic acid, methacrylic acid, their esters, and acrylonitrile; vinylic hydrocarbon monomers reacted with unsaturated materials such as the reaction product of maleic acid with styrene; and, broadly, various other resinous and rubber-like elastomeric latex polymers and copolymers of ethylenically unsaturated monomers and are polymers obtainable in stable aqueous latex form and are capable of coalescing into a pigmented film-forming binder when brushed, sprayed, or rolled onto a surface for curing at room temperature or elevated temperatures. Coalescing assistants such as diethylene glycol monobutyl ether acetate, diethylene glycol monoethyl ether acetate, ethylene glycol monophenyl ether, or 2,2,4-trimethyl-1,3-pentanediol monoisobutyrate, are helpful in modifying the properties of the film-forming latex binders to obtain desired coalescence of the film-forming polymer particles at the ambient coalescing temperature.

The paint of this invention can further contain non-opacifying filler or extender pigments often referred to in the art as inerts and include clays, such as kaolinite clays, silica, talc, mica, wollastonite, barytes, slate flour, calcium carbonate, and other conventional filler pigments. All filler or extender pigments have fairly low Refractive Indices and can be described generally as pigment other than opacifying pigment. Filler and extender pigments generally should not be above 44 microns in effective diameter for painting purposes and generally are of particle size not substantially larger than 25 microns for best finishes. Filler and extender pigments can comprise 0% to 60% of the latex paint on a dry solids volume basis and advantageously between about 5% to 50% in accordance with higher pigment loading aspects of this invention.

The latex paint of this invention can contain tinctorial pigments which are pigmentary materials suitable for imparting a specific hue to the resulting latex emulsion paint. Tinctorial pigments generally include, for example, ferrite yellow oxide, ferric oxide, "brown" iron oxide (which is a blend of red, yellow, and black iron oxides), tan oxide of iron (which is a similar blend), raw sienna and burnt sienna, raw and burnt umber, chromium oxide green, phthalocyanine green (chlorinated copper phthalonitrile) the green iron salt of nitroso beta naphthol, copper, phthalonitrile blue, ultramarine blue, carbon black, lampblack, toluidine red, parachlor red, para toner (red, alkali resistant red, BON red, and marroon), cadmium reds and yellows, Watchung red, madder lake (red), Duratone red, carmine red, chrome yellow (lead chromate), chrome orange, Hansa yellows (which are azo couplings of metranitroparatoluidine and acetoacetanilide), and golden nickel azo complexes such as those shown in U.S. Pat. No. 2,396,327. Other conventional specialty pigmentary additives such as nacreous graphite, nacreous glass frit, etc., and fluorescent, pearlescent and opalescent materials can be classified broadly as tinctorial pigments since such pigmentary additives give special optical effects such as pearlescent and nacreous effects. Tinctorial pigments comprise 0% to 20% and advantageously 0% to 10% of the dry solids volume basis of the opacified latex paint of this invention and such tinctorial pigments are generally opacifying but can be either opacifying or non-opacifying depending on the Index of Refraction.

One interesting and valuable characteristic of the latex emulsion paint of this invention is that higher than conventional sheen and gloss can be obtainable at high PVC's which can be achieved particularly with non-film-forming monodisperse polymer particles having approximately the same size. Useful monodisperse polymer particles can be produced by careful seeding and emulsion polymerization such as suggested in Pierce et al, U.S. Pat. No. 3,423,351 and incorporated herein by reference. In said Pierce patent, water-emulsifiable polymerizable organic liquid having preferably ethylenic carbon-to-carbon unsaturation can be polymerized in a dispersed state in aqueous medium containing anionic and nonionic surfactants under emulsion polymerization conditions wherein the ratio of surfactants is carefully controlled along with the temperature and the water solubility of polymerizable liquid in the reaction mixture. The particle diameter of suspension or emulsion can be readily determined by electron-microscopy techniques. In determining the uniformity or particle diameter, the weight average diameter ($D_w$) is divided by the number average diameter ($D_n$) to provide a $D_w/D_n$ ratio or polydispersity index which determines whether a suspension of polymer particles is monodisperse or polydisperse. When the ratio $D_w/D_n$ is 1.00, the particles are perfectly monodisperse, and for purposes of this invention, all of the polymer particles are considered monodisperse when the $D_w/D_n$ ratio is from 1.0 to about 1.1 and preferably from 1.00 to 1.05.

A further surprising advantage of this invention can be achieved with paint compositions highly loaded with non-film-forming components and having high PVC's beyond the critical surface porosity PVC (enamel holdout) up to about 75% PVC whereby the dried paint films produced have low enamel holdout but surprisingly maintain substantial film integrity properties such as dirt resistance, grime resistance, mar resistance, stain resistance, abrasion resistance, and scrub resistance and like film integrity properties. In accordance with this aspect of the invention, latex paint is preferably based on film-forming binders of acrylic polymers or copolymers containing copolymerized acrylic unsaturated monomers such as for example acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate. The high pigment-binder ratio is beyond the PVC level where sufficient film-forming binder is available to totally encapsulate the non-film-forming solid components. In contrast, conventional latex paints without plastic polymeric particles lack cohesiveness and film integrity at such high PVC's due to a non-continuous paint film phase.

The film-forming binders utilized to coalesce at the temperature of paint application provide drying of the paint film and form a binding matrix for the opacifying pigments, non-film-forming polymer (plastic particles), non-opacifying pigment extenders and fillers and other non-film-forming additives. Coalescing assistants such as diethylene glycol monobutyl ether acetate, diethylene glycol monoethyl ether acetate, 2,2,4-trimethyl-1,3-pentanediol monoisobutyrate, or dibutyl phthalate are useful coalescent materials for the latex paints of the invention.

The latex paint composition of this invention has a PVC broadly between about 30% and 75% wherein the PVC of a paint composition is greater than the critical-PVC as measured by opacity. The latex paints can have a PVC up to 75% and produce dried paint films having excellent film integrity properties such as scrub resistance, burnish resistance, mar resistance, stain resistance, dirt resistance, grime resistance and abrasion resistance which can be all approximately represented by a scrub resistance curve measured in accordance with ASTM Test No. 2486 modified in that a shim is not used. The scrub test is run with a 10% aqueous slurry of Crest soap used as an abrasive scrub medium and reported as the number of scrub cycles to remove 50% of the paint film thickness. Film integrity properties can be expediently measured by scrub resistance wherein the minimum film integrity properties of paint films produced in accordance with this invention withstand at least about 100 scrub cycles, advantageously above 450 scrub cycles for good paint films and preferably at least about 600 scrub cycles for high quality paint films. The most preferred paints have a PVC greater than the critical-PVC (opacity) and less than the critical surface porosity PVC (enamel holdout) indicating that the most preferred paint films have very low film surface porosity. Paint films produced in accordance with the broader aspects of this invention at PVC's above the critical surface porosity PVC have lower enamel holdout properties than the preferred films produced where critical surface porosity PVC is not exceeded. Surprisingly, though, such higher PVC films of this invention retain excellent film integrity properties. This is believed to be achieved by close packing of the solid, noncellular, plastic particles.

The solid, non-film-forming polymer particles appear to effectively resist scrubbing and, even though such particles may become worn down in place, such non-film-forming polymer particles have the advantage of exhibiting exposed solid polymeric material rather than apertures as would be obtained where such worn polymer particles were hollow, tuberculated, or vesiculated. Instead, the worn, clustered plastic pigment particles collectively continue to resist absorption of dirt and grime and do not increase film surface porosity. Paint films of this invention can be further contrasted with that of conventional paint films which expose dry pigments upon scrubbing and consequently become fairly receptive to absorbing surface markings. Accordingly, the inventive paint films in upper PVC ranges can be binder-starved, but nevertheless exhibit good film integrity properties at high PVC's up to 75% PVC. Such unexpectedly good performance may be attributable to some sort of interaction between the solid, non-film-forming plastic particles and the latex paint binder wherein the non-film-forming plastic pigment appears to function as a binder extender or adjuvant in some fashion.

The inventive latex emulsion paint can be made in a disperser mill such as a Cowles disperser. Preferably the conventional pigment dispersion ingredients except the non-film-forming polymer particles and film-forming binder are first mixed together in the disperser mill, or alternatively, a sand mill, a pebble mill, a roller mill, or a ball mill. Then the non-film-forming polymer particles and film-forming binder plus conventional letdown ingredients are added to the resulting mixture and blended in, suitably with a conventional tank stirrer. The resulting paint is an intimate dispersion.

The following Examples illustrate the merits of this invention and provide methods of practicing the invention but should not be construed as limiting the scope of this invention.

EXAMPLE 1

A pigmented latex emulsion paint was prepared as follows:

| Pigment Grind | Pounds | Gallons |
|---|---|---|
| Water | 17.5 | 2.10 |
| Bactericide; 1-(3-chlorallyl)-3,5,7-triazo-1-azoniodomantane chloride. (Dowicil 100, T.M. of Dow Chemical Co.) | 1.0 | .12 |
| Thickener (2.5% aq. soln. of hydroxy ethyl cellulose having a solution viscosity of 15,000 cps). Cellosize QR 1500 | 100.0 | 12.12 |
| Defoamer, mineral oil and silica derivatives. Drew L-475. | 2.0 | .26 |
| Pigment dispersant, sodium salt of polyacrylic acid. Tamol 731, T.M. of Rohm & Haas Co. | 7.8 | .79 |
| Wetting Agent (Triton CF-32, T.M. of Rohm & Haas Co.) | 0.25 | .03 |
| Rutile TiO$_2$ | 175.0 | 5.23 |
| Letdown | | |
| Water | 118.1 | 14.17 |
| Coalescing acid (2,2,4-trimethyl-1, 3-pentanediol monoisobutyrate) | 2.4 | .30 |
| Coalescing aid (diethylene glycol butyl ether acetate) | 9.8 | 1.20 |
| Film-forming binder latex (vinyl acetate-dibutyl maleate copolymer) | 207.7 | 22.91 |
| Non-film-forming plastic particle latex (polystyrene 2325 A) | 254.5 | 29.40 |
| Defoamer. Dow L-475 | 2.0 | .26 |
| Thickener (2.5% aq. soln. of hydroxy ethyl cellulose) | 92.4 | 11.20 |
| TOTALS | 1022.75 | 100.02 |

The resulting pigment-volume-content (PVC) was 65%, the volume solids content was 33%, and the weight solids content was 45.3%.

Paint films were air dried at room temperature (72° F.) for at least 16 hours before the following measurements were made. Opacity is measured on a 3 mil wet film applied to Lenata Form 3B chart and dried at 72° F. for 16 hours wherein reflectance is measured over black and white portions of the chart using a Color Eye spectrophotometer to provide a contrast ratio reported as the ratio of reflectance over black to reflectance over white. Surface porosity is measured by enamel holdout wherein a test paint of 3 mils wet film was applied by a Bird applicator on a Lenata Form 3B opacity chart and dried at 72° F. for at least 16 hours. Thereafter 1.5 mils wet film of alkyd enamel (white alkyd Y-5950 comprising 17.3% TiO$_2$; 14.5% inerts; 30.7% Tall oil alkyd; 37.5% mineral spirits, a product of Glidden-Durkee Division of SCM Corporation) was applied over the dried paint film and the alkyd enamel was dried at room temperature for 24 hours. The gloss of alkyd over the dried latex paint film was compared to the gloss of the same alkyd applied to a sealed substrate. Enamel holdout is reported as the ratio of percent gloss over the test paint when compared to the gloss of the alkyd enamel over the sealed substrate. Surface porosity was also measured by K & N Ink holdout wherein a 3 mil wet film of test paint was drawn down on a 2C Lenata opacity chart by a 3 mil Bird applicator and air dried for 16 hours. K & K Ink is then cast at right angles to the test paint over the white portions of the 2C chart and allowed to dry for two minutes. Excess ink is thereafter rubbed off with paper towels. Penetration of ink into the test film is then measured by reading percent reflectance on the Y scale of an IDL Color Eye colorimeter spectrophotometer (Instrument Development Labs, Koll-morgan Corp.) using a white vitrolite standard. Porosity is indicated by percent reflectance. Similar paint films of 3 mils wet and dried at 72° F. for 16 hours were subjected to abrasion resistance (modified ASTM Test No. D-2486), and stain resistance (Test No. D-2198). The results are set forth in Table 1.

TABLE 1

| Property | |
|---|---|
| PVC | 65% |
| Volume solids | 33% |
| TiO$_2$ level (pounds/100 gal.) | 175 |
| Opacity (Contrast ratio) | .970 |
| Surface porosity (enamel holdout) | 80% |
| Surface porosity (K & N Ink holdout) | 80% |
| Abrasion resistance (scrubbability) | Excellent |
| Stain resistance | Excellent |
| Burnish resistance | Excellent |
| Sheen (% reflectance at 85°) | 60% |
| Gloss (% reflectance at 60°) | 8% |

EXAMPLE 2

A paint similar to Example 1 was compounded at a PVC of 56% and containing non-film-forming polymer particles of 5,200 A. Paint films were tested in the manner of Example 1 and results are listed in Table 2 hereinafter.

EXAMPLE 3

A paint similar to Example 1 was compounded at a PVC of 64% and containing non-film-forming polymer particles of 2,310 A. Paint films were tested in the manner of Example 1 and results are listed in Table 2 hereinafter.

EXAMPLE 4

A paint similar to Example 1 was compounded at a PVC of 70%. Paint films therefrom were tested in the manner set forth in Example 1 and reported in Table 2 hereinafter.

EXAMPLE 5

A prior art paint was formulated containing film-forming latex binder being a copolymer of 82% vinyl acetate and 18% dibutyl maleate, 255 pounds of TiO$_2$ (23%), and inerts. The paint contained by volume 21% TiO$_2$; 5.3% CaCO$_3$; 7.7% silica and silicates; 16.2% said binder; 2% additives; 2.8% glycol and glycol ethers; and 45% water whereby the volume solids was 33% and the PVC was 42.6%. The prior art paint was tested as described in Example 1 and the results thereof are reported in Table 2 hereinafter.

TABLE 2

| | Example 1 | Example 2 | Example 3 | Example 4 | Example 5 (Prior Art) |
|---|---|---|---|---|---|
| PVC (%) | 65 | 56 | 64 | 70 | 42 |
| Volume Solids (%) | 33 | 33 | 33 | 33 | 33 |
| TiO hd 2 (lbs./100 gallons) | 175 | 175 | 175 | 175 | 255 |
| Opacity (contrast ratio) | .970 | .970 | .976 | .984 | .970 |
| Porosity: enamel holdout (%) | 80 | 80 | 80 | 45 | 80 |
| K & N Ink (%) | 80 | 75 | 75 | 40 | 75 |
| Scrub resistance | Excellent | Excellent | Excellent | Fair | Excellent |
| Stain removal | Excellent | Excellent | Excellent | Fair | Excellent |
| Burnish resistance | Excellent | Excellent | Excellent | Fair | Excellent |
| 60° gloss (%) | 8 | 5 | 5 | 15 | 2 |
| 85° sheen (%) | 60 | 55 | 50 | 85 | 4 |
| Plastic particle size | 2325 A | 5200 A | 2310 A | 2325 A | — |
| Polydispersity index | 1.01 | 1.04 | 1.16 | 1.01 | — |

EXAMPLE 6

A pigmented latex emulsion paint was prepared as follows:

A. The following ingredients were dispersed by a Cowles dissolver for about 55 minutes:
  255 parts rutile pigmentary TiO$_2$
  50 parts calcined clay
  60 parts calcium carbonate
  3 parts nonionic surfactant of iso-octyl phenoxy ethanol containing 9-10 ethylene oxide units per mole of phenol (Triton X-100)
  8 parts 15% water solution of a sodium salt of polymeric-carboxylic acid (Tamol 731)
  1 part anti-foam agent, a blend of mineral oils and silica derivatives (Drew 913 SX)
  12 parts ethylene glycol
  2.4 parts water soluble cellulosic thickener of hydroxypropyl methylcellulose containing about 19-24% methoxyl and 4-12% hydroxypropoxyl
  1 part anti-microbial agent, 1-(3-chloallyl)-3,5,7-triazo-1-aconioadomantane chloride
  150 parts water.

B. The following was added to Part A:
  2.3 parts cellulosic thickener hydroxypropyl methylcellulose
  16 parts diethylene glycol monoethyl ether
  4 parts 2,2,4-trimethyl-1, 3-pentanediol monoisobutyrate
  4 parts nonionic surfactant of ammonium salt of sulfate ester of an oxtyl phenoxy polyoxyethylene ethanol (Alipal CO-436, T.M. of GAF Co.)
  4 parts dispersing agent, sodium salt of polymethacyclic acid as a 30% water solution (Tamol 850)
  4 parts anti-foam agent, a blend of mineral oils and silica derivatives (Drew 913SX).

C. A series of latex paints were made by mixing part B (containing part A) with an aqueous dispersion of polystyrene particles and film-forming latex. The polystyrene particles had a weight average particle size of 2450 A, a $D_w/D_n$ of 1.1, weight solids of 51.4%, and a density of 8.59 pounds/gallon, and glass transition temperature of about 100° C. The film-forming latex binder was an aqueous dispersion of film-forming latex binder comprising 82% vinyl acetate copolymerized with 18% dibutyl maleate, being 54.5% weight solids having a weight average particle size of about 6500 A, and a glass transition temperature (Tg) of 15° C. To each paint dispersion was added water so that the volume solids of each indicated formulation was 33.1%. The pigment-volume-content (PVC) of the resulting dry film of each formulation is indicated in Table 3. The percentages indicated for the aqueous dispersion polystyrene and for aqueous dispersion of film-forming latex binder were calculated by dry solids volume basis. The sample indicated as "control" was a conventional latex paint comprising on a dry solids volume basis 57.5% copolymer of 82% vinyl acetate and 18% of dibutyl maleate, and on a dry solids volume basis 23% rutile $TiO_2$, 19.5% inerts, as described in Example 5.

TABLE 3

| Sample No. | Monodisperse Polystyrene Particles | Film-Forming Latex Binder | Pigment-Volume Content (PVC) |
|---|---|---|---|
| A-61 | 3.4% | 57.5% | 42.5% |
| B-65 | 12.4% | 48.5% | 51.5% |
| C-69 | 23.5% | 37.4% | 62.6% |
| D-70 | 33.5% | 27.4% | 72.6% |
| Control | 0 | 57.5% | 42.5% |

Paint films of the foregoing samples were air dried at room temperature (72° F.) for at least 16 hours. The film-forming latex coalesced into a matrix wherein the polystyrene remained particles dispersed therein. Other dried paint films were tested for scattering and opacity as noted hereinafter and the results listed in Table 4.

TABLE 4

| Sample No. | S*, scattering reciprocal mils | X(0.98)**Dry Film thickness for a contrast ratio of 0.98 |
|---|---|---|
| A-61 | 5.5 $mil^{-1}$ | 1.9 mils |
| B-65 | 5.9 $mil^{-1}$ | 1.85 mils |
| C-69 | 5.4 $mil^{-1}$ | 2.0 mils |
| D-70 | 8.0 $mil^{-1}$ | 1.4 mils |
| Control | 4.6 $mil^{-1}$ | 2.4 mils | wherein:
*S = Kubelka-Munk Scattering Coefficient and units are reciprocal mils; and
**X(0.98) = dry film thickness of X thickness which gives a contrast ratio over Lenata Form 3B opacity chart of 0.98, and units are mils. Opacity is determined with Kubelka-Munk solution for multiple light scattering in accordance with page 106 et seq. of Reflectance Spectroscopy, Springs-Verlog, N.Y. (1969).

Similar dried paint films were tested for enamel holdout and scrubbability, in a manner hereinafter described and the results thereof are indicated in Table 5.

TABLE 5

| Sample No. | Enamel Holdout | Scrubbability | Relative Scrub-% of Control |
|---|---|---|---|
| A-61 | 88.4% | 947 cycles | 105% |
| B-65 | 83.7% | 1347 cycles | 150% |
| C-69 | 89.0% | 1800 cycles | 200% |
| D-70 | 3.8% | 700 cycles | 78% |
| Control | 84.9% | 900 cycles | 100% |

Enamel holdout is tested by applying 3 mils wet film by Bird applicator on a Lenata Form 3B opacity chart and air dried at 72° F. for at least 16 hours. Thereafter, 1.5 mils wet film of alkyd enamel (Glidden, white semigloss Y-5950) is applied over the dry latex paint film and dried at room temperature for 24 hours. The alkyd has very poor holdout properties. The gloss of the alkyd over the latex paint is compared to the gloss of the same alkyd applied to a sealed substrate. Enamel holdout is reported at the ratio or percent of gloss over latex paint to gloss over sealed substrate. Scrubbability was measured by applying 6 mils wet film of latex paint by Bird applicator onto a Lenata Form P-121-ION chart and air drying at 72° F. for at least 16 hours. The dried films are subjected to a Gardner scrub machine using a 10% solution of 105 Crest soap in water. Scrubbability is reported as number of cycles to failure (50% of paint film removed).

Improved paint film properties can be achieved at a substantially broader range of PVC's wherein excellent paint films result at higher PVC's. Conventional paints have a narrow critical-PVC wherein opacity and enamel holdout properties are compromised. Conventional high quality latex paints ordinarily exhibit enamel holdout of about 85% and scrubbability of less than 1000 cycles to failure.

EXAMPLE 7

Paint samples were formulated as indicated in the following Table 6 in a manner similar to Example 6. The pigmentary rutile $TiO_2$ content was reduced in a stepwise manner. Opacity was maintained by increasing the concentration of plastic polymer particles while simultaneously decreasing the concentration of titanium dioxide. The volume of polystyrene polymer particles was adjusted to maintain the pigment volume concentration (PVC) of the dry film at about 62.6%. The volume fraction of ingredients indicated in Table 6 are volume fractions in the dry film listed as volume solids on a dry solids volume basis.

TABLE 6

| Sample No. | $TiO_2$ Vol. Fraction | Polystyrene Vol. Fraction | Inert Vol. Fraction | Film-Forming Latex Vol. Fraction |
|---|---|---|---|---|
| E-69 | 23.0% | 23.5% | 16.1% | 37.4% |
| F-76 | 21.7 | 24.8% | 16.1% | 37.4% |
| G-75 | 19.0% | 27.5% | 16.1% | 37.4% |
| H-74 | 16.2% | 30.3% | 16.1% | 37.4% |
| I-73 | 13.5% | 33.0% | 16.1% | 37.4% |
| Control | 23.0% | 0.0% | 18.5% | 57.5% |

Paint films of the foregoing were tested in a manner indicated in Examples 1 to 6, and the results thereof are indicated in the following Table 7.

TABLE 7

| Sample No. | Scattering S, $mil^{-1}$ | Film Thickness for contrast ratio of 0.98 | Scrubbability | Enamel Holdout |
|---|---|---|---|---|
| E-69 | 5.5 $mil^{-1}$ | 2.0 mils | 1800 cycles | 89.0% |
| F-76 | 5.2 $mil^{-1}$ | 2.2 mils | 1200 cycles | 86.6% |
| G-75 | 5.4 $mil^{-1}$ | 2.0 mils | 1850 cycles | 84.3% |
| H-74 | 5.6 $mil^{-1}$ | 2.0 mils | 2000 cycles | 88.4% |
| I-73 | 5.4 $mil^{-1}$ | 2.0 mils | 1400 cycles | 78.6% |
| Control | 4.6 $mil^{-1}$ | 2.4 mils | 900 cycles | 84.9% |

EXAMPLE 8

Paint samples were formulated in a manner similar to Example 6. As indicated in the following Table 8, the concentration of pigmentary rutile titanium dioxide was maintained constant and the content of polystyrene particles was varied. Sufficient inert, as indicated, was added to maintain the pigment-volume-concentration (PVC) of the dry film at about 63.0%. The volume fraction of pigments and film-forming latex based on the dry film is likewise indicated.

TABLE 8

| Sample No. | $TiO_2$ Vol. Fraction | Monodisperse Polystyrene Vol. Fraction | Inert Vol. Fraction | Film-Forming Latex Vol. Fraction |
|---|---|---|---|---|
| J-9D | 13.5% | 8.4% | 41.1% | 37.0% |
| K-9C | 13.5% | 16.8% | 32.7% | 37.0% |
| L-9B | 13.5% | 25.1% | 24.4% | 37.0% |
| M-9A | 13.5% | 33.5% | 16.0% | 37.0% |
| N-7B | 13.5% | 37.5% | 12.0% | 37.0% |
| O-7C | 13.5% | 41.5% | 8.0% | 37.0% |
| P-7D | 13.5% | 45.5% | 4.0% | 37.0% |
| Q-7E | 13.5% | 49.5% | 0 | 37.0% |
| Control | 13.5% | 0 | 49.5% | 37.0% |

Paint films from the foregoing compositions were tested in a manner similar to Example 6. Results are indicated in the following Table 9. Gloss was measured at 85° by ASTM D-523-67.

TABLE 9

| Sample No. | Scattering S, Mil | Film Thickness for Contrast Ratio of 0.98 | Enamel Holdout | 85° Gloss Reading ASTM D-523-67 |
|---|---|---|---|---|
| J-9D | 4.0 mil⁻¹ | 2.6 mils | 84% | 3.2 |
| K-9C | 4.2 mil⁻¹ | 2.5 mils | 90% | 4.8 |
| L-9B | 4.4 mil⁻¹ | 2.4 mils | 96% | 7.8 |
| M-9A | 5.3 mil⁻¹ | 2.1 mils | 94% | 20.6 |
| N-7B | 5.5 mil⁻¹ | 2.0 mils | 95% | 31.8 |
| O-7C | 5.6 mil⁻¹ | 2.0 mils | 94% | 47.0 |
| P-7D | 5.4 mil⁻¹ | 2.0 mils | 94% | 60.6 |
| Q-7E | 5.5 mil⁻¹ | 2.0 mils | 98% | 73 |
| Control | 3.8 mil⁻¹ | 2.7 mils | 35% | 2.8 |

The foregoing demonstrates advantages of this invention wherein the paint mixtures produce films having high sheen although the dried films contain 63% volume percent pigment, whereas conventional latex paint films at 63% produce "flat" films with respect to sheen. Sheen is measured in accordance with ASTM Test No. D-523-67. Further noteworthy advantages of this invention are demonstrated including increased opacity as the plastic polymer content increases from 5 to 37% while at the same time porosity decreases which is uncharacteristic of conventional paint films having a pigment volume concentration of 63%.

EXAMPLE 9

Paint mixtures were formulated in a manner similar to Example 6. In the following Table 10, various indicated film-forming latex binders were utilized in sufficient quantities in the paint formulation to maintain pigment-volume-content in the dry film at about 63%. Total volume solids was maintained at about 33%.

TABLE 10

| Sample No. | Film-Forming Latex Binder | Wt. % Solids | Particle Size | Glass Transition Temp. Tg |
|---|---|---|---|---|
| R-23 | Copolymer of 82% vinyl acetate and 18% dibutyl maleate | 54.4% | 6500 A | 21° C. |
| S-24 | Terpolymer of methyl methacrylate, butyl Acrylate, and acrylic acid | 50.0% | 4800 A | 5° C. |
| T-25 | Copolymer of vinyl chloride and butyl acrylate | 55.0% | 1100 A | unknown |
| U-26 | Copolymer of methyl methacrylate and butyl acrylate | 46.5% | 1100 A | 9° C. |
| V-27 | Copolymer of 83% vinyl acetate and 17% of 2-ethyl-hexyl acrylate | 51.0% | 3500 A | 10° C. |
| W-28 | Terpolymer of vinyl acetate, vinyl chloride, and ethylene | 52.0% | 4800 A | 15° C. |
| X-29 | Terpolymer of methyl methacrylate, methacrylic acid, and butyl acrylate | 65.0% | 30% 850 A | 0° C. |

The foregoing film-forming latex binders were mixed with polystyrene particles, opacifying pigments, and inerts in a manner similar to previous examples. The film-forming latex binders set forth in Table 10 were used in sufficient quantity to maintain the pigment-volume-content in the dry film at approximately 63%. Film-forming binders from Table 10 were utilized at 37%, monodisperse polystyrene particles at 33.0%, and TiO₂ at 13.5%, on a dry solids volume basis. By maintaining constant the ratio of ingredients, however, the paints indicated in the following Table 11 are not necessarily optimized since the preferred useful PVC range depends on the average particle size of plastic particles as well as the relative particle size of binder. Paint films therefrom were tested in a manner similar to Example 6, and the results are indicated in the following Table 11.

TABLE 11

| Sample No. | Film-Forming Latex Binder | Contrast Ratio | Enamel Holdout |
|---|---|---|---|
| X | 37% of R-23 | 0.965 | 99.5% |
| Y | 37% of S-24 | 0.967 | 87.6% |
| Z | 37% of T-25 | 0.951 | 86.5% |
| AA | 37% of U-26 | 0.949 | 95.1% |
| AB | 37% of V-27 | 0.965 | 47.7% |
| AC | 37% of W-28 | 0.961 | 86.5% |
| AD | 37% of X-29 | 0.967 | 86.0% |

Contrast ratio was measured by applying a 3 mil wet film to a Lenata Form 3B opacity chart and air drying to film at 72° F. for at least 16 hours. Reflectance measurements are made over both white and black portions of the chart using a Color Eye Spectrophotometer. Contrast ratio is reported as the ratio of reflectance over black to reflectance over white.

Table 12 indicates binders in Table 10 and Table 11 compounded in optimized formulations at the most preferred PVC.

TABLE 12

| Sample No. | Film-Forming Latex Binder | PVC | Contrast Ratio | Enamel Holdout | Volume Fraction TiO₂ |
|---|---|---|---|---|---|
| AE | R-23 | 65 | .979 | 89.0% | 13% |
| AF | S-24 | 52 | .973 | 88.0% | 13% |
| AG | U-26 | 62 | .969 | 88.5% | 13% |
| AH | X-29 | 60 | .976 | 89.5% | 13% |
| Prior Art Control | R-23 | 42 | .970 | 87.0% | 23% |

EXAMPLE 10

A paint mixture was prepared in a manner similar to that in Example 1, using a homopolymer methyl methacrylate latex as plastic particles. The PVC was 44%, TiO₂ was 13% by volume of paint solids, volume solids of paint was 33%, leaving 31% by volume of plastic particles in the dried paint film. The proper PVC was chosen as described herein to be the point of critical surface porosity.

A paint mixture was formulated in a manner similar to Example 1, using homopolymer vinyl chloride as plastic particles. The PVC was 52%, volume solids 33%; the paint film contained 13% by volume of TiO₂ and 39% plastic particles. The proper PVC was chosen as the point of critical surface porosity as described herein.

Table 13 summarizes the results of opacity and porosity measurements.

TABLE 13

| Plastic Particle Composition | Particle Size | Poly-dispersity | PVC | Enamel Holdout | Contrast Ratio |
|---|---|---|---|---|---|
| Homopolymer vinyl chloride | 1,790 A | 1.12 | 52 | 81% | .970 |
| Homopolymer methyl methacrylate | 2,694 A | 1.06 | 44 | 80% | .966 |

EXAMPLE 11

A paint sample (BP-73) was formulated containing 150 pounds TiO$_2$, 222.4 pounds latex binder (vinyl acetate-dibutyl maleate copolymer, 54.4% by weight solids), 183.3 pounds monodisperse plastic pigment (polystyrene latex, 51.4% by weight polymer particles), and other components as indicated in Example 6. The PVC of the paint was 62.6% and the film-forming solids was 33%.

A similar paint (BP-145) was formulated except that the non-film-forming plastic pigment was polydispersed (polydispersity 1.19 and 52.9% solids by weight). The paint had a PVC of 62.6% and a film-forming solids of 33%.

A similar paint (BP-105) contained a plastic pigment a blend of equal parts of 8 latexes having average particle sizes as follows: 725 A; 875 A; 950 A; 1250 A; 2450 A; 2600 A; 2850 A; and 6550 A.

The physical properties of paint film produced from the foregoing paints are set forth in Table 14.

TABLE 14

| Sample No. | Opacity Contrast Ratio (C/R) | Enamel Holdout | K&N Ink | Scrub cycles |
|---|---|---|---|---|
| BP-73 | 0.964 | 79% | 84.7% | 1400 |
| BP-145 | 0.965 | 75.6% | 77.5% | — |
| BP-105 | 0.955 | 99.5% | 78.1% | 995 |

EXAMPLE 12

A series of paints containing varrying amounts of TiO$_2$ and plastic pigment was formulated at a constant PVC of 63%. The binder was a copolymer of vinyl acetate and dibutyl maleate (R-23) maintained at 37% by volume. The plastic pigment was polystyrene of an average particle size of 2225 A. The opacity as measured by contrast ratio (C/R) and K&N Ink Test on dried paint films obtained as in previous examples are shown in Table 15.

TABLE 15

| Sample No. | TiO$_2$ Volume | Polystyrene Volume | Opacity C/R | K&N Ink |
|---|---|---|---|---|
| BP-110 | 0% | 63% | 0.791 | 65.3% |
| BP-111 | 6.3% | 56.7% | 0.946 | 80.5% |
| BP-112 | 12.6% | 50.4% | 0.972 | 81.1% |
| BP-113 | 18.9% | 44.1% | 0.983 | 79.5% |
| BP-114 | 25.2% | 37.8% | 0.989 | 78.5% |
| BP-120 | 63% | 0% | 0.995 | 44.9T |

EXAMPLE 13

A series of paints similar to Example 12 was formulated at a constant PVC of 63% with variable amounts of polystrene plastic pigment but at a constant TiO$_2$ level of 19.4% by volume. Calcium carbonate filler pigment was added to maintain a constant PVC of 63% and binder of 37% by volume. Paint films were tested as in previous examples and set forth in Table 16.

TABLE 16

| Sample No. | TiO$_2$ % Volume | Polystyrene % Volume | Opacity C/R | K&N Ink |
|---|---|---|---|---|
| BP-121 | 19.4 | 43.6 | 0.986 | 83.5% |
| BP-122 | 19.4 | 40.0 | 0.985 | 81.9% |
| BP-123 | 19.4 | 35.9 | 0.980 | 78.7% |
| BP-124 | 19.4 | 32.0 | 0.975 | 81.3% |
| BP-125 | 19.4 | 28.1 | 0.978 | 82.3% |
| BP-126 | 19.4 | 23.7 | 0.973 | 79.7% |
| BP-127 | 19.4 | 19.4 | 0.967 | 77.7% |
| BP-128 | 19.4 | 14.6 | 0.978 | 75.3% |
| BP-129 | 19.4 | 10.0 | 0.965 | 69.5% |

EXAMPLE 14

The paint sample previously designated in Example 6 as C-69 was modified by adding 1% by weight of black colorant which is a 5.1% dispersion of carbon black in ethylene glycol base. A wet paint film of 3 mils was cast upon a Lenata opacity chart form 3B by a Bird applicator and air dried at room temperature for at least 16 hours. The dried film as a reflectance of 78.7 as measured through a Y filter of a Color Eye spectrophotometer. For comparison, a conventional dry latex paint film similarly modified by 1% black colorant had a reflectance of 73.6%. Coventional paint films require approximately 50% more TiO$_2$ to match the improved tinting strength of the latex emulsion of this invention as measured by reflectance.

The foregoing examples illustrate the latex paint of this invention providing substantially improved opacity concurrent with substantially improved film integrity properties. The advantageous improvements of this invention are achieved by including non-film-forming plastic pigment in the latex paint in combination with opacifying pigments at higher pigment volume content above the critical-PVC as measured by opacity. It is contemplated within the scope of this invention that specific non-film-forming polymer particles can be produced to exhibit reactive surface groups by incorporating functional monomers onto the polymer particle surfaces to achieve ultraviolet cure, mildew resistance, and control of woodstain migration through the paint coatings. The illustrative examples are not intended to be limiting except as defined by the appended claims.

We claim:

1. An aqueous latex dispersion paint composition which coalesces at an ambient coalescing temperature into a hardened paint film, said latex paint having about 30% to 70% by weight total solids and comprising on a dry solids volume basis:
   25% to 70% of a film-forming latex binder having a major weight portion of polymer particles between about 1,000 A and 10,000 A and having a glass transition temperature at least about 5° C. below said coalescing temperature whereby said binder particles will coalesce into a binding matrix, said latex binder being a polymer or a copolymer derived from ethylenically unsaturated monomers;
   10% to 60% of solid, non-cellular, non-film-forming polymer particles having a weighted average diameter between about 1,000 A and 10,000 A and having a glass transition temperature at least about 30° C. above the glass transition temperature of said binder, said non-film-forming particles being polymerized ethylenically unsaturated monomers having carbon-to-carbon unsaturation;
   5% to 25% opacifying pigment having a refractive index of at least about 1.8 and being in a volumetric proportion less than the volumetric proportion of said non-film-forming polymer particles;
   0% to 60% of non-opacifying pigment; and
   said latex paint having a pigment-volume-content (PVC) between about 30% to 75% wherein the PVC is greater than the critical-PVC (opacity) as measured by the lower break in the opacity curve.

2. The aqueous latex paint set forth in claim 1 wherein said pigment-volume-content (PVC) is between about 48% and 64%.

3. The aqueous latex paint set forth in claim 1 wherein said solid, non-cellular, non-film-forming particles are between about 1,000 A and 6,000 A.

4. The aqueous latex paint set forth in claim 1 containing between about 15% and 50% solid, non-cellular, non-film-forming particles.

5. The aqueous latex paint set forth in claim 1 wherein the non-film-forming polymer particles comprise polymers derived from the monomers selected from the group consisting of styrene, methyl methacrylate, and vinyl chloride.

6. The aqueous latex paint set forth in claim 1 containing up to about 20% tinctorial pigments on a dry solids volume basis.

7. The latex paint in claim 1 wherein the paint contains between 5% and 50% of non-opacifying pigment on a dry solids volume basis.

8. The latex paint in claim 1 wherein the PVC of the latex paint is greater than the critical-PVC as measured by opacity and less than the critical surface porosity-PVC as measured by enamel holdout.

9. An aqueous latex dispersion paint composition which coalesces at an ambient coalescing temperature into a hardened paint film, said latex paint having about 30% to 70% by weight total solids and comprising on a dry solids volume basis:
  25% to 70% of a film-forming latex binder having a major weight portion of polymer particles not smaller than 1,000 A and having a glass transition temperature at least about 5° C. below said coalescing temperature whereby said binder particles will coalesce into a binding matrix, said latex binders being polymers and copolymers derived from ethylenically unsaturated monomers;
  5% to 70% of solid, non-cellular, non-film-forming polymer particles having a weighted average diameter between about 1,000 A and 10,000 A and having a glass transition temperature at least about 25° C. above said coalescing temperature and at least about 30° C. above the glass transition temperature of said binder, said non-film-forming particles being polymerized organic liquids having carbon-to-carbon unsaturation;
  5% to 30% opacifying pigment having a refractive index of at least about 1.8 and being a volumetric proportion less than the volumetric proportion of said non-film-forming polymer particles;
  0% to 60% of extender and filler pigments other than said opacifying pigment; and
  said latex paint having a pigment-volume-content (PVC) greater than the critical-PVC (opacity) as measured by the lower break in the opacity curve, and said pigment-volume-content (PVC) being less than the critical surface porosity-PVC (enamel holdout) as measured by the upper break in the enamel holdout curve.

10. An aqueous latex dispersion paint composition which coalesces at an ambient coalescent temperature into a hardened paint film, said latex paint having about 30% to 70% by weight total solids and comprising on a dry solids volume basis:
  25% to 70% of a film-forming latex binder having a major weight portion of polymer particles between about 1,000 A and 10,000 A and having a glass transition temperature at least about 5° C. below said coalescing temperature whereby said binder particles will coalesce into a binding matrix, said latex binder being a polymer of a copolymer derived from ethylenically unsaturated monomers;
  5% to 60% of solid, non-cellular, non-film-forming polymer particles having a weighted average diameter between about 1,000 A and 10,000 A and having a glass transition temperature at least about 30° C. above the glass transition temperature of said binder, said non-film-forming particles being polymerized ethylenically unsaturated monomers having carbon-to-carbon unsaturation;
  5% to 25% opacifying pigment having a refractive index of at least about 1.8;
  0% to 60% of non-opacifying pigment; and
  said latex paint having a pigment-volume-content (PVC) greater than the critical -PVC (opacity) as measured by the lower break in the opacity curve, and said pigment-volume-content (PVC) being less than the critical surface porosity-PVC (enamel holdout) as measured by the upper break in the enamel holdout curve.

* * * * *

UNITED STATES PATENT AND TRADEMARK OFFICE
CERTIFICATE OF CORRECTION

PATENT NO. : 4,069,186
DATED : January 17, 1978
INVENTOR(S) : Alex Ramig

It is certified that error appears in the above-identified patent and that said Letters Patent are hereby corrected as shown below:

Columns 13 and 14, line 7, in the first column of Table 2, "TiO hd 2 (lbs./100 gallons)" should read --$TiO_2$ (lbs./100 gallons)--. Column 17, line 57, in Table 10, under the column entitled Particle Size, underneath "30% 850A," insert --70% 6000A--. Column 19, in Table 15, last line under the column entitled K&N Ink, "44.9T" should read --44.9%--. Column 22, line 27, "of" should read --or--.

Signed and Sealed this

Eleventh Day of July 1978

[SEAL]

Attest:

RUTH C. MASON
Attesting Officer

DONALD W. BANNER
Commissioner of Patents and Trademarks